(12) United States Patent
Son et al.

(10) Patent No.: US 11,970,182 B2
(45) Date of Patent: Apr. 30, 2024

(54) CARELESSNESS DETERMINATION METHOD BASED ON ANALYSIS OF DRIVER'S BIOLOGICAL STATE, AND SMART CRUISE CONTROL ASSOCIATION SYSTEM AND METHOD USING THE SAME

(71) Applicant: HYUNDAI MOBIS CO., LTD., Seoul (KR)

(72) Inventors: Tae Yoon Son, Anyang-si (KR); Young Min Jang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 49 days.

(21) Appl. No.: 17/986,953

(22) Filed: Nov. 15, 2022

(65) Prior Publication Data
US 2023/0150527 A1 May 18, 2023

(30) Foreign Application Priority Data
Nov. 17, 2021 (KR) .......................... 10-2021-0158884

(51) Int. Cl.
| | |
|---|---|
| G08B 23/00 | (2006.01) |
| B60W 40/08 | (2012.01) |
| B60W 40/105 | (2012.01) |
| B60W 50/14 | (2020.01) |
| G06V 20/56 | (2022.01) |
| G06V 20/59 | (2022.01) |
| G06V 40/18 | (2022.01) |

(52) U.S. Cl.
CPC ............ *B60W 50/14* (2013.01); *B60W 40/08* (2013.01); *B60W 40/105* (2013.01); *G06V 20/56* (2022.01); *G06V 20/597* (2022.01); *G06V 40/18* (2022.01); *B60W 2420/403* (2013.01); *B60W 2540/225* (2020.02); *B60W 2540/229* (2020.02); *B60W 2555/20* (2020.02); *B60W 2556/50* (2020.02)

(58) Field of Classification Search
CPC .... B60W 50/14; B60W 40/08; B60W 40/105; B60W 2556/50; B60W 2540/225; B60W 2555/20; B60W 2540/229; B60W 2420/403; G06V 20/597; G06V 40/18; G06V 20/56
USPC .......................................................... 340/576
See application file for complete search history.

(56) References Cited

U.S. PATENT DOCUMENTS

| | | | | |
|---|---|---|---|---|
| 2009/0237644 A1* | 9/2009 | Uechi | ................... | B60W 30/10 356/29 |
| 2015/0334269 A1* | 11/2015 | Yokota | .................... | G06T 11/60 382/103 |

(Continued)

FOREIGN PATENT DOCUMENTS

KR 2019-0050633 A 5/2019

*Primary Examiner* — Naomi J Small
(74) *Attorney, Agent, or Firm* — NovoTechIP International PLLC

(57) ABSTRACT

The present disclosure relates to a carelessness determination method based on the analysis of a driver's biological state and an SCC association system and method using the same, which can determine a driver's carelessness state by using a line of sight of the driver, a change in the size of the pupil of the driver according to a vehicle speed, and external environment information and can forcedly change the subject of driving into a vehicle based on SCC when the driver's carelessness state is determined as a driver carelessness situation.

12 Claims, 7 Drawing Sheets

(56) References Cited

U.S. PATENT DOCUMENTS

| | | | |
|---|---|---|---|
| 2016/0003636 A1* | 1/2016 | Ng-Thow-Hing | G01C 21/365 701/418 |
| 2022/0121274 A1* | 4/2022 | Aher | G06V 40/18 |
| 2023/0150518 A1* | 5/2023 | Zhao | G01S 17/42 701/1 |

* cited by examiner

CARELESSNESS DETERMINATION METHOD BASED ON ANALYSIS OF DRIVER'S BIOLOGICAL STATE, AND SMART CRUISE CONTROL ASSOCIATION SYSTEM AND METHOD USING THE SAME

CROSS-REFERENCE TO RELATED APPLICATIONS

This application claims priority to and the benefit of Korean Patent Application No. 10-2021-0158884, filed on Nov. 17, 2021, the disclosure of which is incorporated herein by reference in its entirety.

TECHNICAL FIELD

The present disclosure relates to a carelessness determination method based on the analysis of a driver's biological state and a smart cruise control (SCC) association system and method using the same. More particularly, the present disclosure relates to a carelessness determination method based on the analysis of a driver's biological state and an SCC association system and method using the same, which may determine a driver's carelessness state by using a line of sight of the driver, a change in the size of the pupil of the driver according to a vehicle speed, and external environment information without determining the carelessness of the driver based on a uniform determination parameter criterion for the carelessness of the driver and may forcedly change the subject of driving into a vehicle based on SCC when the driver's carelessness state is determined as a driver carelessness situation.

BACKGROUND

A conventional carelessness warning system based on the analysis of a driver's state uses a method of determining and giving warning of a driver carelessness situation based on a predetermined determination rule, such as a specific behavior (e.g., a driver does not keep his or her eyes forward or eye closing) of the driver or the deviation of a vehicle from a front area by using a camera.

For example, a front area deviation determination is a method of giving warning when a front area, a vehicle speed, or a deviation time predefined by a vehicle manufacturer is exceeded. An eye closing determination is a method of giving warning depending on whether an eye closing time predefined by a manufacturer is exceeded.

In such a conventional carelessness warning system, in order to determine a change in the level of a driver carelessness situation and warning timing, a manufacturer has arbitrarily defined a driver carelessness determination parameter. In this case, there is a problem in that carelessness warning is not properly given because a warning and level change condition is not satisfied or false warning occurs due to an erroneous determination because a change in the carelessness level and the warning timing are determined based on a determination parameter generalized with respect to all drivers.

SUMMARY

Various embodiments are directed to providing a carelessness determination method based on the analysis of a driver's biological state and a smart cruise control (SCC) association system and method using the same, which may determine a driver's carelessness state by using a line of sight of the driver, a change in the size of the pupil of the driver according to a vehicle speed, and external environment information without determining the carelessness of the driver based on a uniform determination parameter criterion for the carelessness of the driver and may forcedly change the subject of driving into SCC when the driver's carelessness state is determined as a driver carelessness situation.

In an embodiment, in a carelessness determination method based on an analysis of a driver's biological state and a smart cruise control (SCC) association system using the method, the SCC association system may include a vehicle state information acquisition unit configured to obtain vehicle state information including vehicle speed information and GPS location information from multiple sensors installed in a vehicle, a driver monitoring camera unit configured to monitor and track a line of sight of a driver in real time and identify a pupil state of the driver, a front camera unit configured to obtain a front view image by capturing an area in front of the vehicle, a gaze location mapping unit configured to check a distance up to a gaze location of the driver by mapping the gaze location of the driver obtained by the driver monitoring camera unit to the front view image obtained by the front camera unit, and a carelessness situation determination unit configured to check a focal distance for the gaze location of the driver based on a change in a size of the pupil of the driver according to a vehicle speed, compare the focal distance for the gaze location of the driver and a distance up to the gaze location, which is checked by the front camera unit, determine a state of the driver as a driver carelessness situation when a result of the comparison is a preset numerical value or more, and generate and output a warning signal.

In an embodiment, the SCC association system may further include an SCC association unit configured to forcedly drive an SCC function of the vehicle when a time for the driver carelessness situation determined by the carelessness situation determination unit elapses by a given time.

In an embodiment, the SCC association unit may compare the focal distance for the gaze location of the driver and the distance up to the gaze location, which is checked by the front camera unit, in a given cycle in the state in which the SCC function has been forcedly driven, may determine the state of the driver as a driver care situation when determining that the result of the comparison will not be the preset numerical value or more, and may release the SCC function.

In an embodiment, the carelessness situation determination unit may determine a degree of a change in a viewing angle of the driver based on a change in the size of the pupil of the driver according to the vehicle speed, and may incorporate the determined degree into the check of the focal distance.

In an embodiment, the carelessness situation determination unit may determine the degree of a change in the viewing angle of the driver based on a change in the size of the pupil of the driver according to the vehicle speed, and may individually store a change in the size of the pupil for each driver.

In an embodiment, the vehicle state information acquisition unit may further obtain real-time weather information and real-time time information from the vehicle. the carelessness situation determination unit may incorporate, into a change in the size of the pupil of the driver according to the vehicle speed, a road or tunnel entry state and entry time of the vehicle checked based on the GPS location information, the real-time weather information, and the real-time time information.

In an embodiment, the gaze location mapping unit may partition the obtained front view image into a sky area and multiple ground areas, and may obtain a location value of the gaze location of the driver by mapping the gaze location of the driver to the partitioned front view image. The carelessness situation determination unit may check the focal distance for the gaze location of the driver by using the obtained location value.

In an embodiment, the driver monitoring camera unit may identify the pupil state of the driver based on light quantity information around the vehicle, which is obtained by the vehicle state information acquisition unit.

In an embodiment, the driver monitoring camera unit may generate a signal for the determination of the driver carelessness situation when a line of sight of the driver is not identified for a given time or more as a result of monitoring and tracking the line of sight of the driver in real time, and may transmit the signal to the carelessness situation determination unit.

In another embodiment, in a carelessness determination method based on the analysis of a driver's biological state and a smart cruise control (SCC) association system using the method, the SCC association system may include a vehicle state information acquisition unit installed in a vehicle and configured to obtain vehicle state information including vehicle speed information and GPS location information according to a driving of the vehicle, a driver monitoring camera unit configured to monitor and track a line of sight of a driver in real time and identify a pupil state of the driver, a front camera unit configured to obtain a front view image by capturing an area in front of the vehicle, a gaze location mapping unit configured to check a distance up to a gaze location of the driver by mapping the gaze location of the driver obtained by the driver monitoring camera unit to the front view image obtained by the front camera unit, a carelessness situation determination unit configured to check a focal distance for the gaze location of the driver based on a change in a size of the pupil of the driver according to a vehicle speed, compare the focal distance for the gaze location of the driver and a distance up to the gaze location, which is checked by the front camera unit, determine a state of the driver as a driver carelessness situation when a result of the comparison is a preset numerical value or more, and generate and output a warning signal, and an SCC association unit configured to forcedly drive an SCC function of the vehicle when a time for the driver carelessness situation determined by the carelessness situation determination unit elapses by a given time.

In an embodiment, when determining that the gaze location of the driver maintains a specific location for a preset time or more in the state in which the SCC function has been forcedly driven, the SCC association unit may determine the state of the driver as a driver care situation and release the SCC function.

In still another embodiment, in a carelessness determination method based on an analysis of a driver's biological state and an SCC association method using the method, the method may include obtaining, by a vehicle state information acquisition unit, vehicle state information including vehicle speed information and GPS location information from multiple sensors installed in a vehicle, monitoring and tracking, by a driver monitoring camera unit, a line of sight of a driver in real time and identify a pupil state of the driver, obtaining, by a front camera unit, a front view image by capturing an area in front of the vehicle, checking, by a gaze location mapping unit, a distance up to a gaze location of the driver by mapping the gaze location of the driver obtained by the driver monitoring camera unit to the front view image obtained by the front camera unit, and checking, by a carelessness situation determination unit, a focal distance for the gaze location of the driver based on a change in a size of the pupil of the driver according to a vehicle speed, comparing the focal distance for the gaze location of the driver and a distance up to the gaze location, which is checked by the front camera unit, determining a state of the driver as a driver carelessness situation when a result of the comparison is a preset numerical value or more, and generate and output a warning signal.

According to an aspect of the present disclosure, there is an advantage in that a driver can be safely protected by determining a driver's carelessness state by using a line of sight of the driver, a change in the size of the pupil of the driver according to a vehicle speed, and external environment information without determining the carelessness of the driver based on a uniform determination parameter criterion for the carelessness of the driver and forcedly changing the subject of driving into SCC when the driver's carelessness state is determined as a driver carelessness situation.

Furthermore, according to an aspect of the present disclosure, there is an advantage in that convenience can be improved by automatically tuning a driver-adaptive determination parameter for a carelessness determination.

Furthermore, according to an aspect of the present disclosure, there is an advantage in that determination logic performance can be improved by determining driver-adaptive carelessness warning timing and level change timing.

Furthermore, according to an aspect of the present disclosure, there is an advantage in that optimal determination parameter tuning is made possible by more closely analyzing a driver state compared to a conventional predetermined carelessness determination parameter.

DETAILED DESCRIPTION

Figure 1:
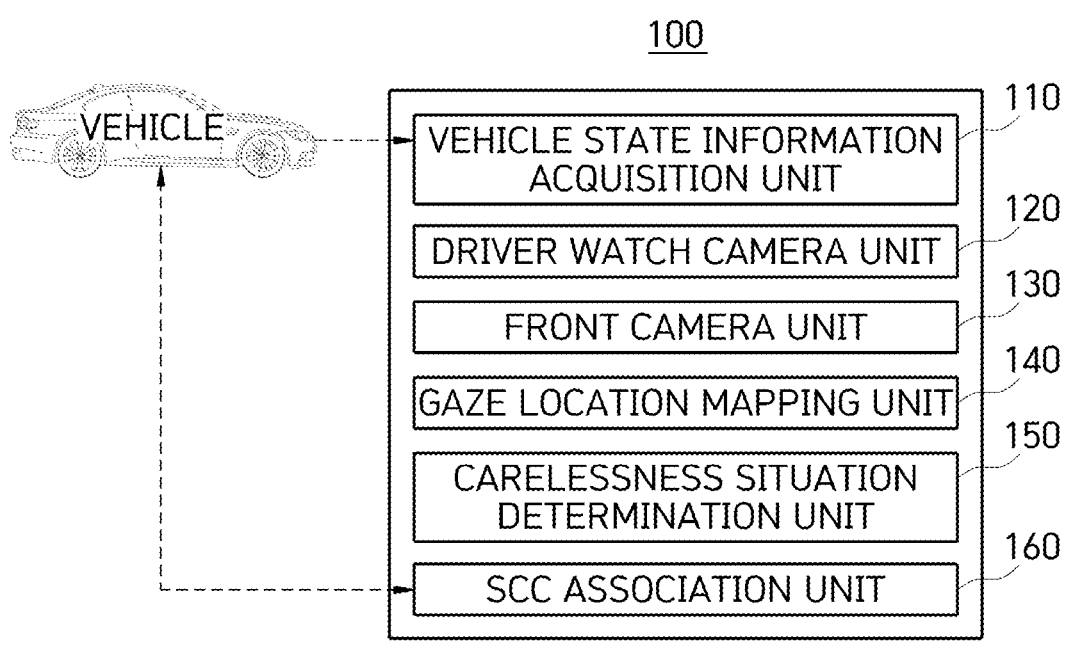
FIG. 1 is a diagram illustrating a construction of a carelessness determination method based on the analysis of a driver's biological state and a smart cruise control (SCC) association system 100 using the same according to an embodiment of the present disclosure.

The present disclosure may be variously modified and may have various embodiments. Specific embodiments are to be illustrated in the drawings and to be specifically described in the detailed description. It is however to be understood that the present disclosure is not intended to be limited to the specific embodiments and includes all of modifications, equivalents and/or substitutions included in the spirit and technical range of the present disclosure. In describing the present disclosure, a detailed description of the known technologies will be omitted if it is deemed to make the subject matter of the present disclosure unnecessarily vague.

Terms, such as a "first" and a "second", may be used to describe various elements, but the elements should not be restricted by the terms. The terms are used to only distinguish one element from the other element.

The terms used in this application are merely used to describe a specific embodiment, and are not intended to limit the present disclosure. An expression of the singular number includes an expression of the plural number unless clearly defined otherwise in the context. It is to be understood that a term, such as "include" or "have", in this application is intended to designate that a characteristic, a number, a step, an operation, an element, a part or a combination of them described in the specification is present, and does not exclude the presence or addition possibility of one or more other characteristics, numbers, steps, operations, elements, parts, or combinations of them in advance. Hereinafter, embodiments of the present disclosure are described in detail with reference to the accompanying drawings.

Figure 2:
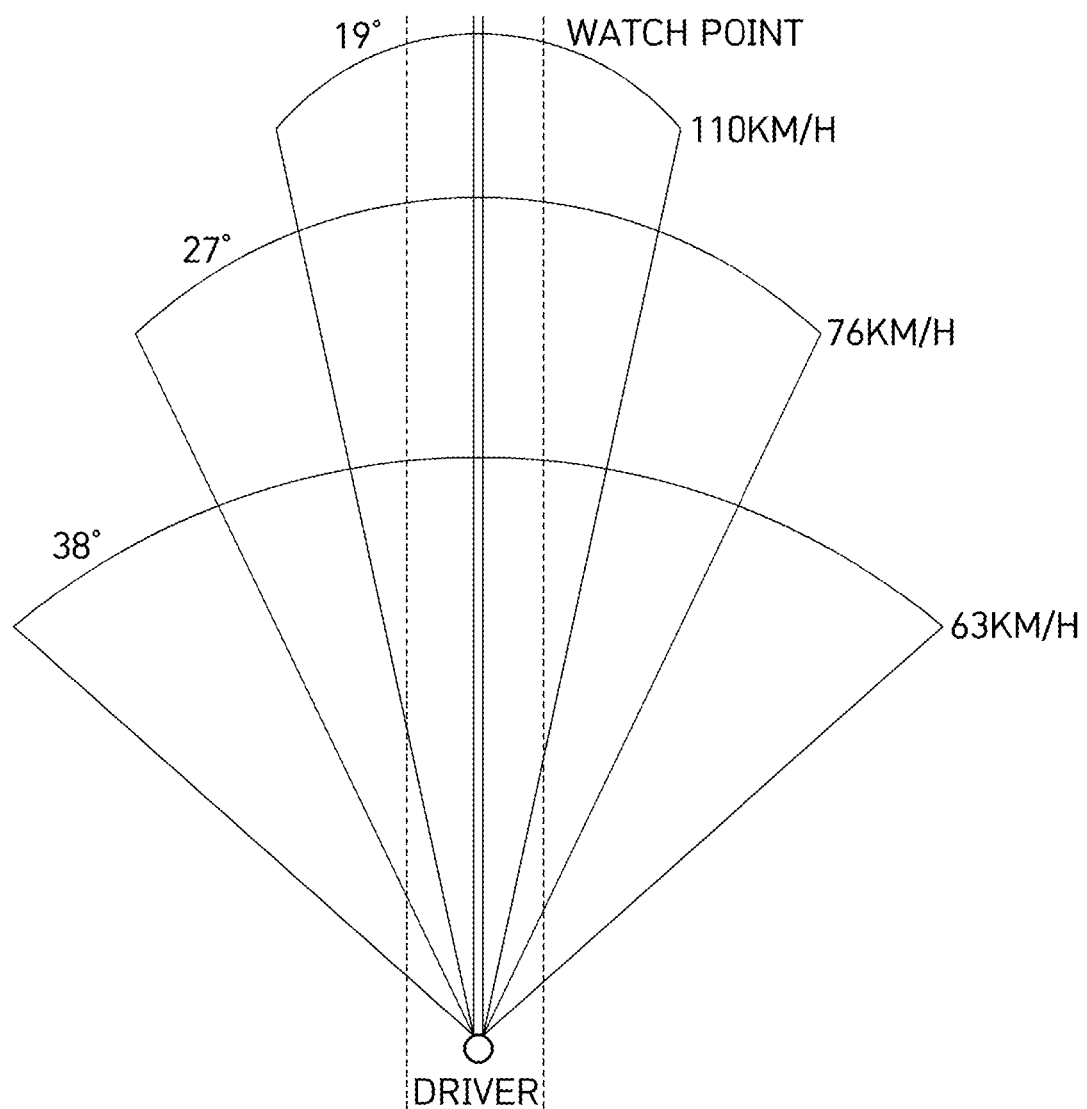
FIG. 2 is a diagram illustrating a focal distance and viewing angle of a driver according to a vehicle speed upon driving of a vehicle.
Figure 3:
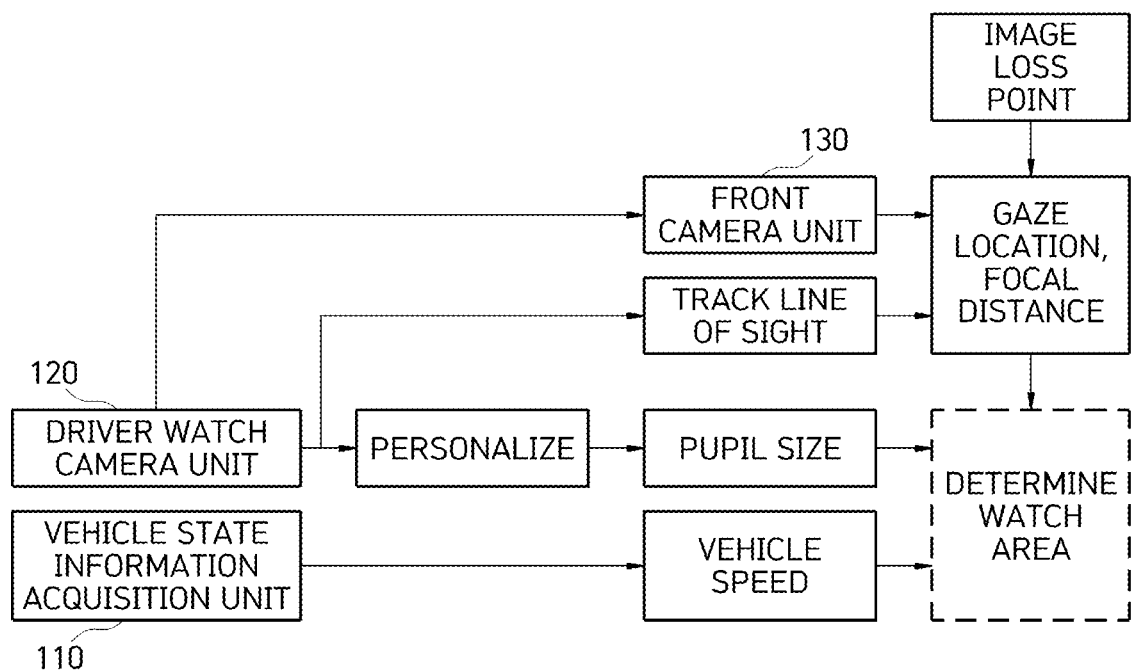
FIG. 3 is a diagram illustrating a process of determining a gaze area of a driver by using the carelessness determination method based on the analysis of a driver's biological state and the SCC association system 100 using the same, which is illustrated in FIG. 1.

FIG. 1 is a diagram illustrating a construction of a carelessness determination method based on the analysis of a driver's biological state and a smart cruise control (SCC) association system 100 using the same according to an embodiment of the present disclosure. FIG. 2 is a diagram illustrating a focal distance and viewing angle of a driver according to a vehicle speed upon driving of a vehicle. FIG. 3 is a diagram illustrating a process of determining a gaze area of a driver by using the carelessness determination method based on the analysis of a driver's biological state and the SCC association system 100 using the same, which is illustrated in FIG. 1.

Referring to FIGS. 1 to 3, the carelessness determination method based on the analysis of a driver's biological state and the SCC association system 100 using the same according to an embodiment of the present disclosure may be configured to include a vehicle state information acquisition unit 110, a driver monitoring camera unit 120, a front camera unit 130, a gaze location mapping unit 140, a carelessness situation determination unit 150, and an SCC association unit 160.

The vehicle state information acquisition unit 110 obtains vehicle state information, including vehicle speed information, steering wheel manipulation information, turn indicator manipulation information, and GPS location information, from multiple various sensors installed in a vehicle. The obtained vehicle state information may be used to analyze behavior information of the vehicle and to analyze an external environment. Furthermore, the vehicle state information acquisition unit 110 may also additionally obtain real-time weather information and real-time time information from the sensors installed in the vehicle.

The driver monitoring camera unit 120 monitors and tracks a line of sight of a driver who is in the driver's seat in real time. In this case, the driver monitoring camera unit 120 functions to identify a pupil state of the driver. In this case, the pupil state may mean a change in the pupil state of the driver. The light of sight of the driver may include central vision and peripheral vision. The central vision may mean a field of vision in which an image of an object is focused on the center of the retina and the object can be viewed most sharply and accurately. The peripheral vision is the outside range of a line of sight, and may mean a portion that receives visual information from a portion that is not focused.

Referring to FIG. 2, a focal distance and viewing angle of a driver sight are different as a vehicle drives. For example, a viewing angle of the driver is about 100° at 40 km/h, the viewing angle of the driver is about 65° at 70 km/h, and the viewing angle of the driver is about 40° at 100 km/h.

That is, as the speed of the vehicle is increased, the focal distance of the driver is increased, but the viewing angle of the driver is reduced.

Such a point is related to a change in the focal distance of a driver according to a change in the size of the pupil of the driver. When the size of the pupil of a driver is reduced, the focal distance of the driver is increased and central vision thereof is reduced. When the size of the pupil of a driver is increased, the focal distance of the driver is reduced and the central vision thereof is increased. In particular, upon nighttime driving, a large amount of light is input to the pupil of a driver as the pupil becomes large. Accordingly, a glare phenomenon occurs, and a focused distance range is limited compared to that upon daytime driving.

Accordingly, in the present disclosure, the carelessness of a driver is determined based on correlation between the size of the pupil, viewing angle (i.e., central vision and peripheral vision), and focal distance of the driver.

The driver monitoring camera unit 120 may be installed toward an eyeball of the driver within the vehicle, may monitor and track a line of sight of the driver while tracking a movement of the eyeball of the driver in real time, and may identify a change in the size of the pupil of the driver. In particular, the driver monitoring camera unit 120 may identify a change in the size of the pupil of the driver according to a vehicle speed, and may transmit the change to the carelessness situation determination unit 150.

The front camera unit 130 may obtain a front view image by capturing an area in front of the vehicle and transmit the front view image to the gaze location mapping unit 130 so that a distance up to a gaze location of the driver is checked. As the gaze location mapping unit 140 maps the driver's line of sight, gaze location, etc. obtained by the driver monitoring camera unit 120 to the front view image that is captured by the front camera unit 130, the distance up to the gaze location of the driver may be checked.

The gaze location mapping unit 140 may check a distance up to a gaze location of the driver by mapping the gaze location that is obtained by the driver monitoring camera unit 120 to a front view image that is obtained by the front camera unit 130. To this end, the front view image that is obtained by the front camera unit 130 may be partitioned into a sky area, multiple ground areas, and a road. A location value of the gaze location of the driver may be obtained by mapping the gaze location of the driver to the partitioned front view image. The gaze location mapping unit 140 may include a distance measurement sensor (not illustrated). The distance measurement sensor may check an actual distance up to the gaze location of the driver mapped to the front view image.

The obtained location value of the gaze location may be transmitted to the carelessness situation determination unit 150. The carelessness situation determination unit 150 may check a focal distance for a corresponding gaze location of the driver by using the obtained location value.

After obtaining vehicle speed information from the vehicle state information acquisition unit 110, the carelessness situation determination unit 150 checks a focal distance for the gaze location of the driver based on a change in the size of the pupil of the driver according to the vehicle speed upon driving of the vehicle, compares the focal distance for the gaze location of the driver and the distance up to the gaze location that is checked by the front camera unit 130, determines a state of the driver as a driver carelessness situation when a result of the comparison is a preset numerical value or more, and may generate and output a warning signal.

For example, if the driver gazes at a specific location in the state in which the vehicle drives at a specific speed, a pupil state (a pupil size) of the driver is automatically adjusted based on a corresponding vehicle speed by a biological reaction. That is, the driver monitoring camera unit 120 identifies such a change in the size of the pupil of the driver. The carelessness situation determination unit 150 compares a focal distance according to a change in the size of the pupil of the driver according to the vehicle speed and an actual distance up to a corresponding gaze location that is checked by the front camera unit 130 and the gaze location mapping unit 140. When the focal distance that is calculated based on the size of the pupil of the driver according to the specific vehicle speed and the actual distance up to the corresponding gaze location are identical with each other, the carelessness situation determination unit 150 determines that the driver currently pays attention to his or her driving.

When the focal distance that is calculated based on the size of the pupil of the driver according to the specific vehicle speed and the actual distance up to the corresponding gaze location are not identical with each other and have a distance difference (e.g., 10 m) or more, the carelessness situation determination unit 150 computes the setting of a front area parameter for a carelessness determination, and determines a state of the driver as a driver carelessness situation. Furthermore, the carelessness situation determination unit 150 computes a level change time parameter based on a warning time for the carelessness determination and the distance difference, and generates and outputs a warning signal based on the computed level change time parameter so that the driver recognizes his or her carelessness determination state.

Furthermore, the carelessness situation determination unit 150 may determine the degree of a change in the viewing angle of the driver based on a change in the size of the pupil of the driver according to the vehicle speed, and may incorporate the determined degree into the check of the focal distance. In this case, since a change in the size of the pupil is different for each driver, the carelessness situation determination unit 150 personalizes a driver carelessness determination for each driver by individually storing a change in the size of a pupil for each driver.

Furthermore, the carelessness situation determination unit 150 can more accurately identify a change in the size of the pupil of a driver based on the analysis of an environment according to a change in the external situation by incorporating, into a change in the size of the pupil of the driver according to the vehicle speed, a road, tunnel entry state, and entry time of a vehicle, real-time weather information, and real-time time information that are checked based on GPS location information obtained by the aforementioned vehicle state information acquisition unit 110.

In particular, as in FIG. 3, the carelessness situation determination unit 150 may determine a gaze area that is now carefully watched by a driver, based on vehicle speed information that is obtained by the vehicle state information acquisition unit 110, a pupil state (pupil size) of the driver that is identified by the driver monitoring camera unit 120, and a distance up to a gaze location of the driver and a focal distance for the gaze location of the driver that are checked by the front camera unit 130 and the gaze location mapping unit 140, respectively.

Figure 4A:
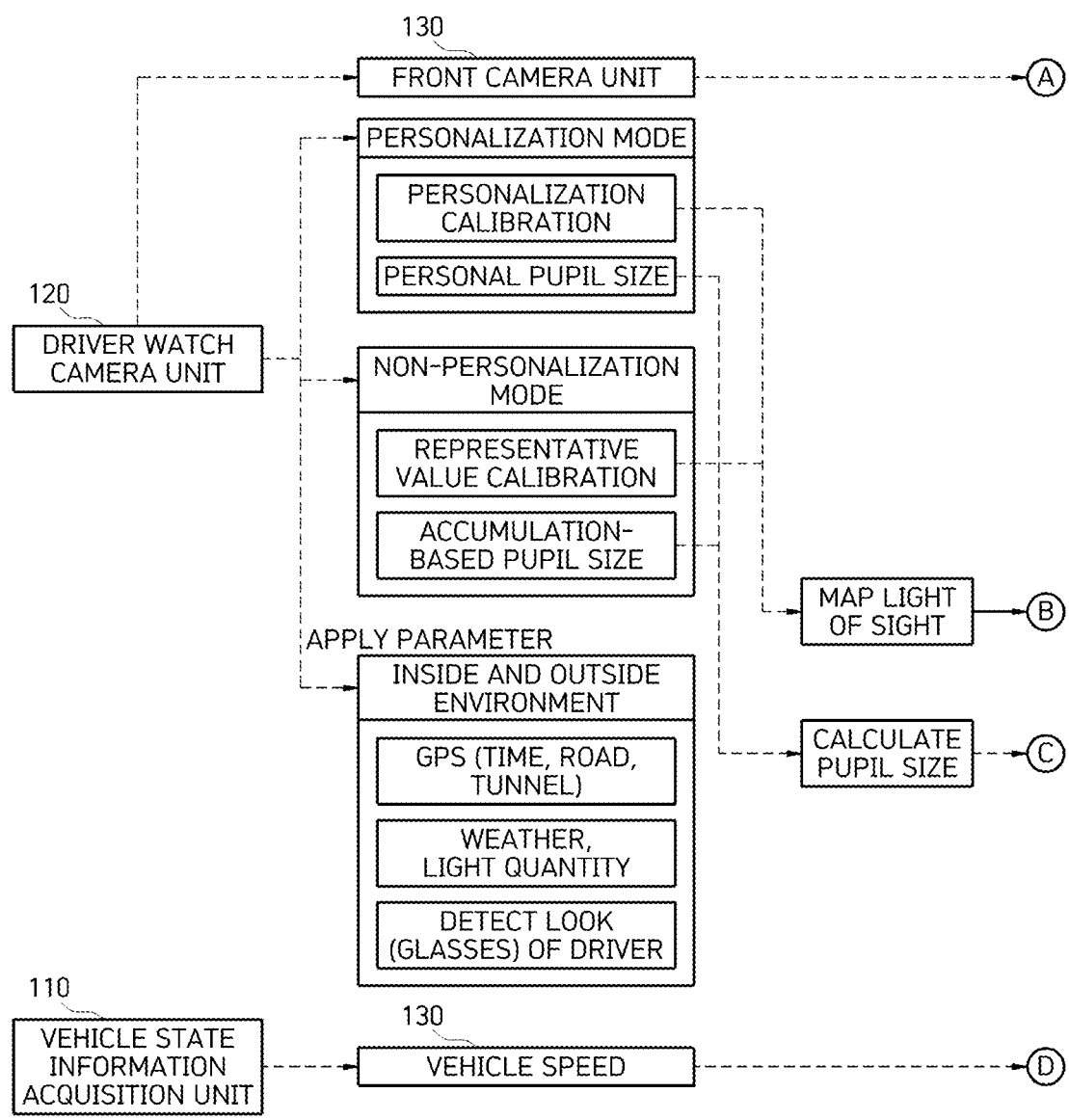
FIGS. 4A and 4B are a diagram illustrating the entire process of determining the carelessness of a driver by using the carelessness determination method based on the analysis of a driver's biological state and the SCC association system 100 using the same, which is illustrated in FIG. 1.
Figure 4B:
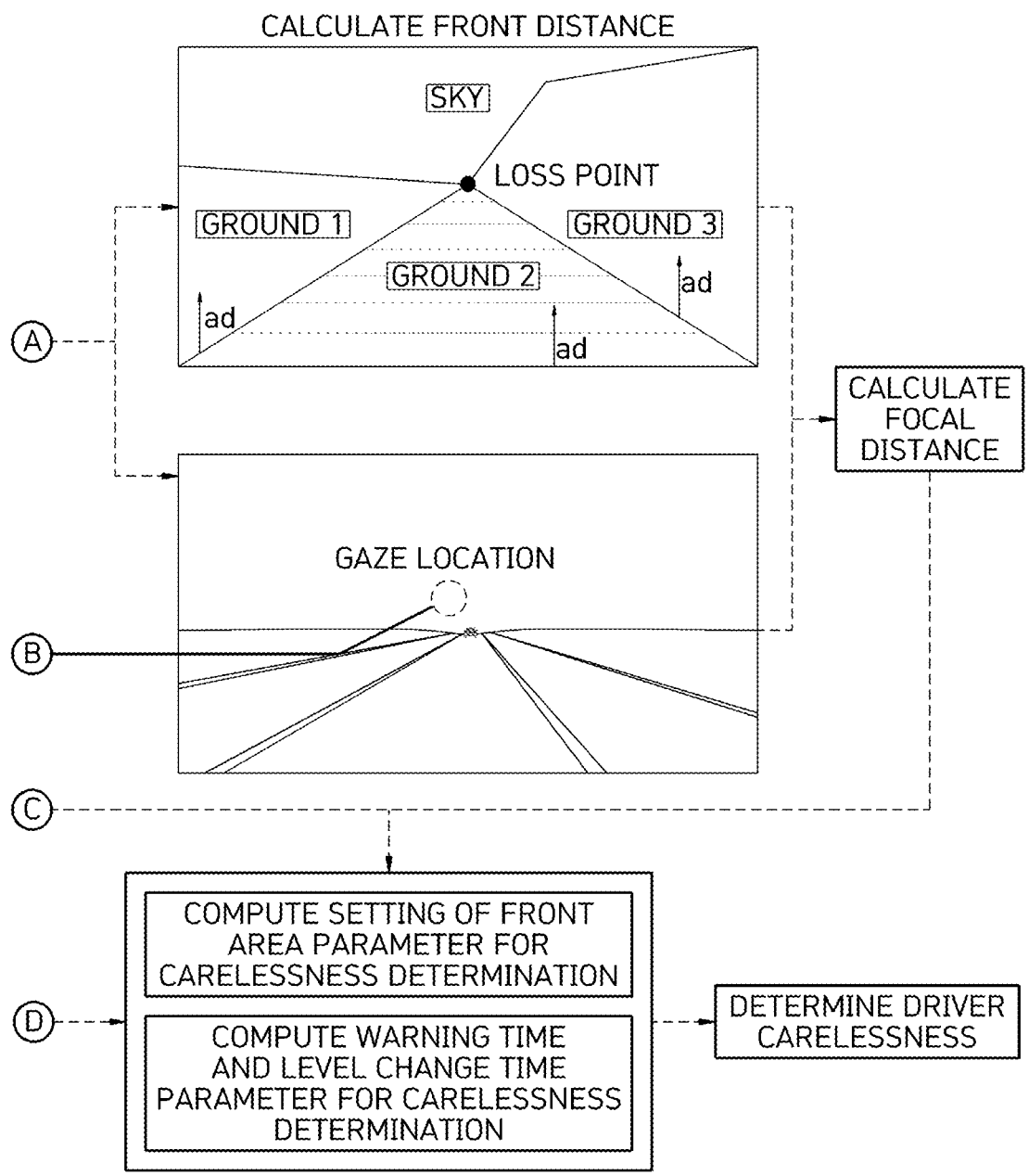

FIGS. 4A and 4B are a diagram illustrating the entire process of determining the carelessness of a driver by using the carelessness determination method based on the analysis of a driver's biological state and the SCC association system 100 using the same, which is illustrated in FIG. 1.

Referring to FIGS. 4A and 4B, the vehicle state information acquisition unit 110 obtains vehicle state information from multiple sensors installed in a vehicle, and transmits the vehicle state information to the carelessness situation determination unit 150. The driver monitoring camera unit 120 identifies a pupil state of each driver, and monitors and tracks a line of sight of the driver in real time. In this case, the obtained gaze location of the driver is mapped to a front view image that is captured by the front camera unit 130.

The carelessness situation determination unit 150 identifies a focal distance for the gaze location based on the size of a pupil of the driver according to a vehicle speed, and computes the setting of a parameter for a gaze area of the driver for a carelessness determination by comparing the checked focal distance and an actual distance up to the gaze location that is checked by the front camera unit. When a result of the comparison meets a predetermined threshold (e.g., the comparison value is a preset numerical value or higher), the carelessness situation determination unit 150 determines a state of the driver as a driver carelessness situation, computes a warning time and a resultant level change time parameter, and generates and outputs a warning signal based on the warning time and the resultant level change time parameter so that the driver can recognize the driver carelessness situation.

In an embodiment, the SCC association unit 160 may determines whether to forcedly perform the SCC function of a vehicle based on the result of the determination of the driver carelessness situation by the carelessness situation determination unit 150. This is described with reference to FIGS. 5A and 5B.

Figure 5A:
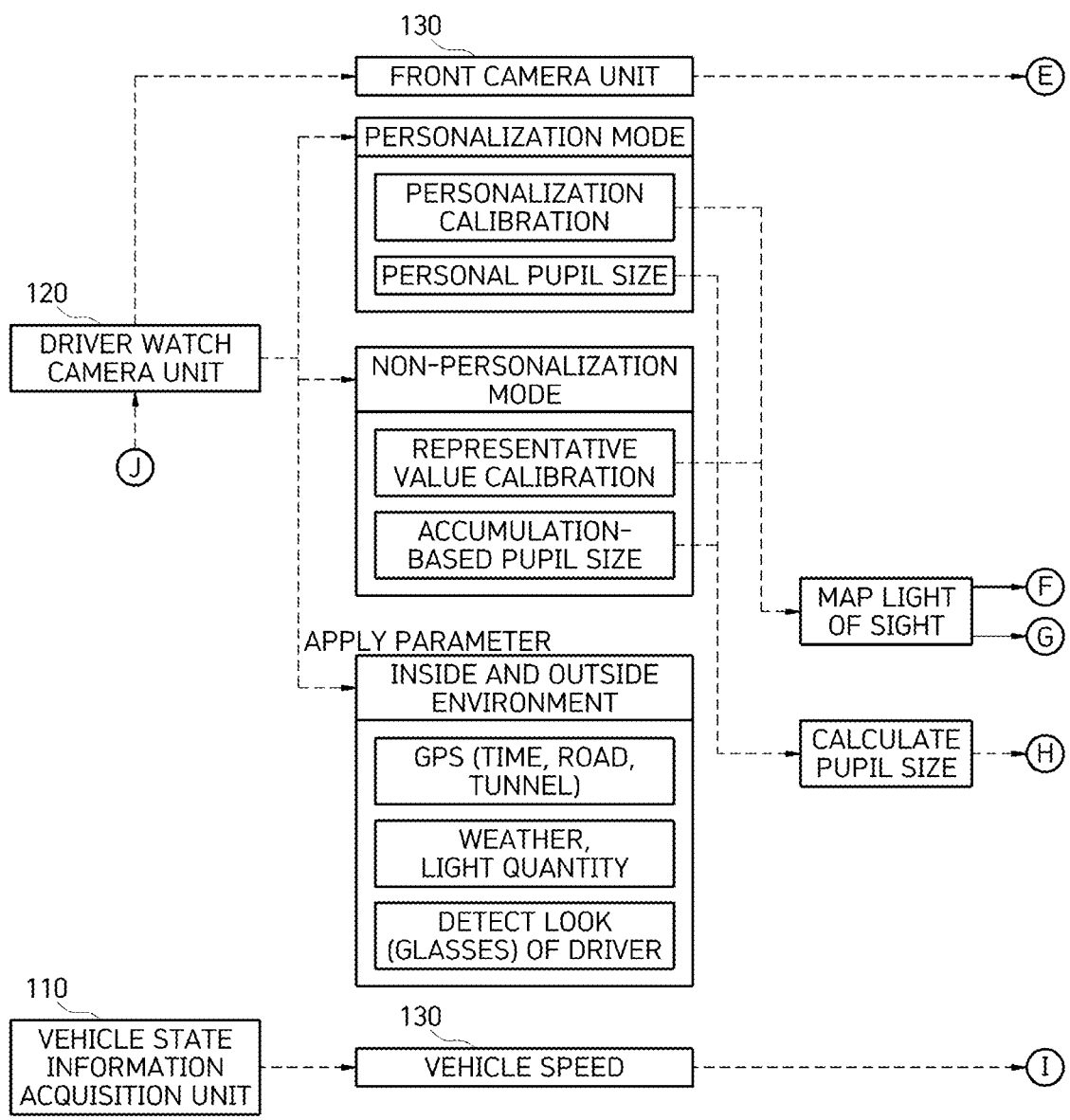
FIGS. 5A and 5B are a diagram illustrating the entire process of associating SCC by using the carelessness determination method based on the analysis of a driver's biological state and the SCC association system 100 using the same, which is illustrated in FIGS. 4A and 4B.
Figure 5B:
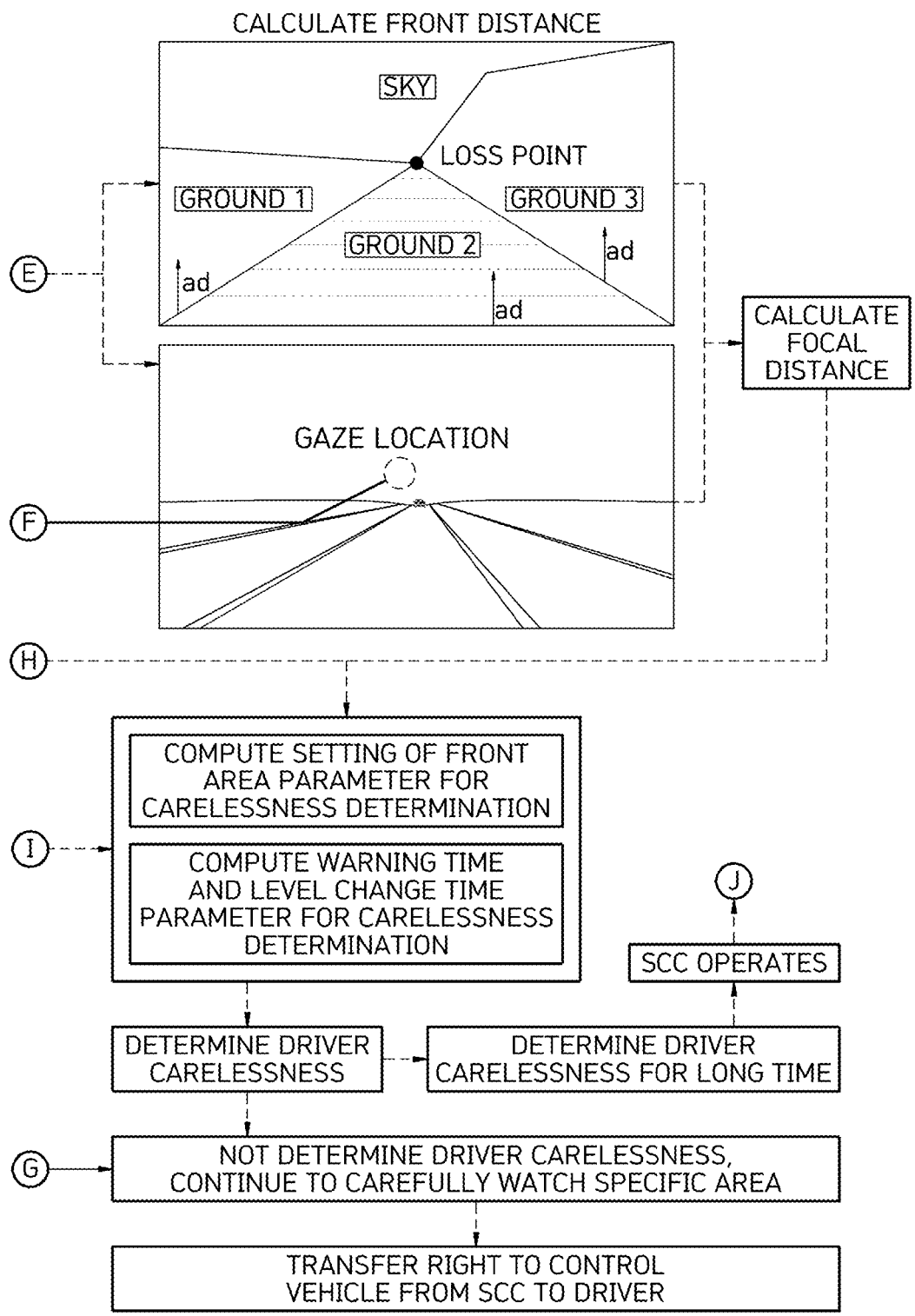

FIGS. 5A and 5B are a diagram illustrating the entire process of associating SCC by using the carelessness determination method based on the analysis of a driver's biological state and the SCC association system 100 using the same, which is illustrated in FIGS. 4A and 4B. FIGS. 5A and 5B starts from the result of the determination of the carelessness of the driver by the carelessness situation determination unit 150 in FIGS. 4A and 4B.

When the time for the driver carelessness situation determined by the carelessness situation determination unit 150 elapses by a given time (or the driver is determined to have been in the carelessness situation for a predetermined period), the SCC association unit 160 takes over the right to control the vehicle by forcedly driving the SCC function installed in the vehicle.

At this time, if a gaze area of the driver is not a road area in a front view image that is obtained by the front camera unit 130, but the time when the vehicle is inclined to a specific location is increased or repeated, or a pupil state of the driver is not identified for the given time or more by the driver monitoring camera unit 120, the carelessness situation determination unit 150 may recognize a driving-impossible posture and determine a state of the driver as a driver carelessness situation. Accordingly, the carelessness situation determination unit 150 transmits, to the SCC association unit 160, a signal to transfer the right to control the vehicle.

The SCC association unit 160 continuously compares a focal distance of the driver for a gaze location and a distance up to a gaze location that is checked by the front camera unit 130 in a given cycle in the state in which the SCC function has been forcedly driven. When a difference between the focal distance and an actual distance is within a given range as a result of the comparison or if it is determined that a gaze area of the driver determined by the carelessness situation determination unit 150 is within the area of a front view image that is captured by the front camera unit 130, the SCC association unit 160 determines that the driver pays attention to his or her driving again and intends to continue the driving, and releases the SCC function of the vehicle so that the right to control the vehicle is transferred to the driver again.

Although the present disclosure has been described with reference to the preferred embodiments, those skilled in the art may understand that the present disclosure may be modified and changed in various ways without departing from the spirit and scope of the present disclosure written in the claims.

What is claimed is:

1. A smart cruise control (SCC) association system for detecting carelessness of a driver of a vehicle, the SCC association system comprising:
    a vehicle state information acquisition unit configured to obtain, from a plurality of sensors disposed at the vehicle, vehicle state information comprising vehicle speed information and GPS location information;
    a driver monitoring camera unit configured to monitor and track a line of sight of the driver in real time and identify a pupil state of the driver;
    a front camera unit configured to capture an area in front of the vehicle and generate a front view image;
    a gaze location mapping unit configured to check a distance to a gaze location of the driver by mapping the driver's line of sight to the front view image; and
    a carelessness situation determination unit configured to:
        check a focal distance for the driver's gaze location based on a change to a size of the driver's pupil;
        perform a first comparison between the focal distance for the driver's gaze location and the distance to the driver's gaze location;
        determine whether a result of the first comparison meets a predetermined threshold; and
        in response to determining that the result of the first comparison meets the predetermined threshold, determine that the driver is in a careless situation and generate a warning signal.

2. The SCC association system of claim 1, further comprising an SCC association unit configured to enforce an SCC function of the vehicle when the driver is in the carelessness situation for a predetermine period.

3. The SCC association system of claim 2, wherein the SCC association unit is configured to:
    perform, while the SCC function is enforced, a second comparison between the focal distance for the driver's gaze location and the distance to the driver's gaze location;
    determine whether the result of the second comparison meets the predetermined threshold; and
    in response to determining that the result of the second comparison does not meet the predetermined threshold, release the SCC function.

4. The SCC association system of claim 1, wherein the carelessness situation determination unit is further configured to:
    determine a change to the driver's viewing angle based on a change to the size of the driver's pupil; and
    check the focal distance for the driver's gaze location further based on the determined change to the driver's view angle.

5. The SCC association system of claim 4, wherein the carelessness situation determination unit is further configured to store, at a data storage, the change to the size of the driver's pupil.

6. The SCC association system of claim 1, wherein:
    the vehicle state information acquisition unit is further configured to obtain weather information and time information from the vehicle, and
    the carelessness situation determination unit is configured to determine the change to the size of the driver's pupil based on the GPS location information, the weather information and the time information.

7. The SCC association system of claim 1, wherein:
    the gaze location mapping unit is configured to partition the obtained front view image into a sky area and one or more ground areas and obtain a location value of the driver's gaze location by mapping the driver's gaze location to the partitioned front view image, and
    the carelessness situation determination unit is configured to check the focal distance for the driver's gaze location based on the obtained location value of the driver's gaze location.

8. The SCC association system of claim 1, wherein:
    the vehicle state information acquisition unit is further configured to obtain light quantity information around the vehicle, and
    the driver monitoring camera unit is configured to identify the driver's pupil state based on the light quantity information around the vehicle.

9. The SCC association system of claim 1, wherein the driver monitoring camera unit is configured to output, to the carelessness situation determination unit, a signal requesting to determine whether the driver is in the carelessness situation when the driver's line of sight is not identified for a predetermined period.

10. A carelessness determination method based on the analysis of a driver's biological state and a smart cruise control (SCC) association system using the method, the SCC association system comprising:
    a vehicle state information acquisition unit comprising multiple sensors installed in a vehicle and configured to obtain vehicle state information comprising vehicle speed information and GPS location information according to a driving of the vehicle;
    a driver watch camera unit configured to carefully watch and track a line of sight of a driver in real time and identify a pupil state of the driver;
    a front camera unit configured to obtain a front capturing image by capturing an area in front of the vehicle;
    a gaze location mapping unit configured to check a distance up to a gaze location of the driver by mapping the gaze location of the driver obtained by the driver watch camera unit to the front capturing image obtained by the front camera unit;
    a carelessness situation determination unit configured to check a focal distance for the gaze location of the driver based on a change in a size of the pupil of the driver according to a vehicle speed, compare the focal distance for the gaze location of the driver and a distance up to the gaze location, which is checked by the front camera unit, determine a state of the driver as a driver carelessness situation when a result of the comparison is a preset numerical value or more, and generate and output a warning signal; and an SCC association unit configured to forcedly drive an SCC function of the vehicle when a time for the driver carelessness situation determined by the carelessness situation determination unit elapses by a given time.

11. The SCC association system of claim 10, wherein when determining that the gaze location of the driver maintains a specific location for a preset time or more in a state in which the SCC function has been forcedly driven, the SCC association unit determines the state of the driver as a driver care situation and releases the SCC function.

12. A carelessness determination method based on an analysis of a driver's biological state and an SCC association method using the method, the method comprising:

obtaining, by a vehicle state information acquisition unit, vehicle state information comprising vehicle speed information and GPS location information from multiple sensors installed in a vehicle;

carefully watching and tracking, by a driver watch camera unit, a line of sight of a driver in real time and identify a pupil state of the driver;

obtaining, by a front camera unit, a front capturing image by capturing an area in front of the vehicle;

checking, by a gaze location mapping unit, a distance up to a gaze location of the driver by mapping the gaze location of the driver obtained by the driver watch camera unit to the front capturing image obtained by the front camera unit; and checking, by a carelessness situation determination unit, a focal distance for the gaze location of the driver based on a change in a size of the pupil of the driver according to a vehicle speed, comparing the focal distance for the gaze location of the driver and a distance up to the gaze location, which is checked by the front camera unit, determining a state of the driver as a driver carelessness situation when a result of the comparison is a preset numerical value or more, and generate and output a warning signal.

* * * * *